July 30, 1963 L. A. MEACHAM 3,099,712

SYNCHRONIZING CIRCUIT

Filed June 6, 1960

INVENTOR
L. A. MEACHAM
BY R. O. Nimtz
ATTORNEY

United States Patent Office 3,099,712
Patented July 30, 1963

3,099,712

SYNCHRONIZING CIRCUIT

Larned A. Meacham, New Providence, N.J., assignor to Bell Telephone Laboratories, Incorporated, New York, N.Y., a corporation of New York Filed June 6, 1960, Ser. No. 34,263
8 Claims. (Cl. 178—69.5)

Figure 1:
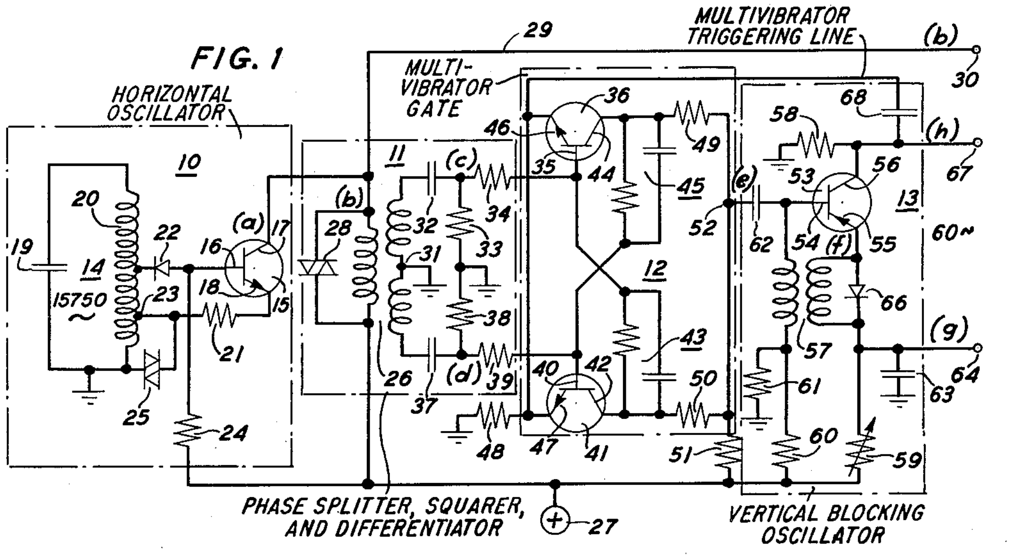

This invention relates to synchronization signal generators and, more particularly, to economical interlaced television scanning signal generators.

In order to generate interlaced television scanning signals, it is conventional practice to generate vertical and horizontal scanning pulses having a fixed ratio between their respective repetition rates. If this ratio is kept within narrow limits of any member of a large class of suitable numerical values, the generation of an interlaced pattern or raster is possible by well-known scanning procedures. One obvious way in which to generate pulses having a fixed ratio is to obtain the pulses themselves by frequency division or count-down techniques. While this method can provide almost absolute assurance of a proper interlace, it has the disadvantage of requiring a large amount of circuitry with the attendant penalties of higher cost and lower reliability.

Another method of generating an interlaced pattern, the so-called "random interlace" technique, calls for the separate generation of horizontal and vertical scanning pulses. In order to generate an approximation of a 2:1 interlaced pattern with this technique, it is necessary that the independent frequencies of the vertical and horizontal oscillators be respectively stabilized to a high degree of accuracy. This requirement is not difficult to meet for the horizontal oscillator. A vertical oscillator, however, which has a relatively low frequency, presents a very difficult design problem for the order of precision required. Resulting structures are usually bulky, complicated and costly.

It is an object of the present invention to reduce the cost and complexity of television synchronizing signal generators while maintaining good scanning resolution.

It is a more specific object of the invention to produce a locked 2:1 interlace of a television scanning pattern with simple, inexpensive circuit components.

In accordance with the present invention, horizontal and vertical scanning pulses are produced at their approximate respective repetition rates with simple, inexpensive oscillators. These oscillators are coupled together by utilizing the horizontal oscillator output as an ancillary timing wave to trigger the vertical oscillator. In order to insure a proper 2:1 interlace regardless of the actual frequency ratio of the horizontal and vertical outputs, the horizontal output used as a trigger for the vertical oscillator is shifted in phase by 180 degrees after each cycle of the vertical oscillator.

This phase shift in the triggering wave causes the vertical oscillator to be triggered at the end of each $(n+\frac{1}{2})$ complete cycles of the horizontal oscillator regardless of their respective natural frequencies, $n$ being an integer. That is, if $n$ is the instantaneous integral ratio of the respective period durations of the two oscillators, with intercoupling but without the phase reversals, the circuits of the present invention cause the vertical oscillator to be triggered at a half cycle earlier or later than this ratio would normally dictate. Since the "½" term always provides an accurate 2:1 interlace, the actual value of $n$ can vary from time to time over a moderate range without impairing the interlace of the scanning pattern.

While the present disclosure gives attention primarily to scanning waveforms in a television transmitter, it is assumed that techniques well-known in the art are to be used to control corresponding waveforms of an associated receiver in precise synchronism with those of the transmitter.

The use of an interlaced pattern improves the vertical resolution of the resulting picture by a factor of two without adding any further burden to the transmission system. A simple and inexpensive circuit for taking advantage of this fact is therefore highly advantageous in such fields of application as closed circuit television and videotelephony, where low cost is commonly a prime objective. The present invention meets this requirement.

These and other objects and features, the nature of the present invention and its various advantages, will be more readily understood upon consideration of the attached drawing and of the following detailed description of the drawing.

Figure 2:
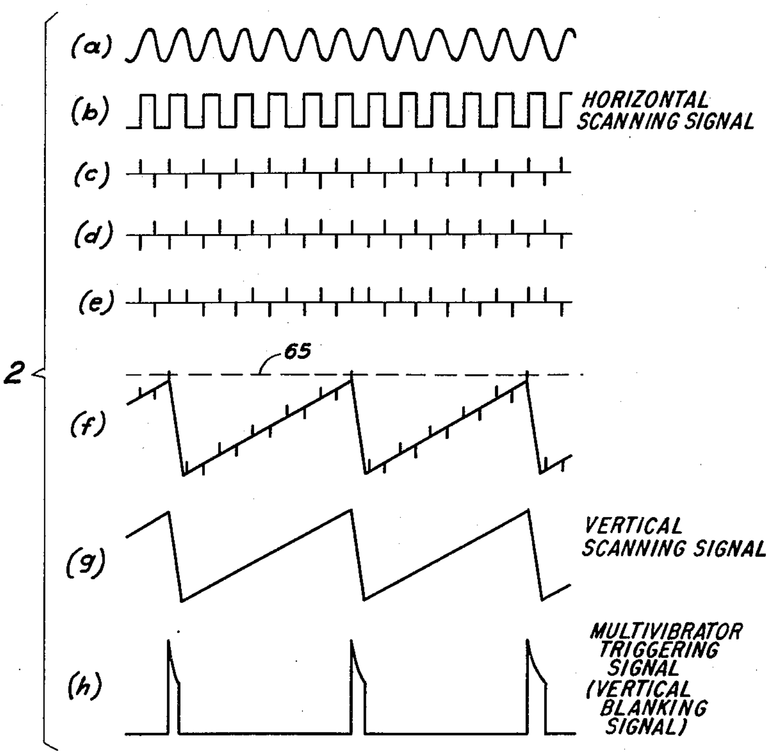

In the drawing:

FIG. 1 is a schematic diagram of a television synchronization signal generator providing 2:1 interlace accordance with the present invention; and FIG. 2 comprises graphical representations of various waveforms useful in the description of FIG. 1.

Referring more particularly to FIG. 1, there is shown a schematic diagram of a television scanning signal generator comprising a horizontal oscillator 10, a limiting, phase splitting and differentiating network 11, a bistable gate circuit 12, and a vertical oscillator 13. Horizontal oscillator 10 comprises a tank circuit 14 and an n-p-n transistor 15 having a base electrode 16, a collector electrode 17 and an emitter electrode 18. Tank circuit 14 includes a capacitor 19 and a tapped inductor element 20. The base 16 of transistor 15 is connected through biasing diode 22 to the upper tap of inductor 20. Emitter electrode 18 of transistor 15 is connected through a negative feedback resistor 21 to the lower tap 23 of inductor 20. Base 16 is biased by diode 22, supplied with current through resistor 24 from source 27, to cause transistor 15 to operate in a linear portion of its operating characteristic: Diode 22, preferably of silicon, affords a stable bias potential of about 0.6 volt, while presenting a low alternating current impedance to signal currents.

Oscillator 10 operates with bridge-stabilized oscillator action as disclosed in the copending application of the present applicant and F. West, Serial Number 759,474, filed September 8, 1958, by which oscillatory voltages induced in tank circuit 14 by currents drawn through emitter 18 and negative feedback resistor 21 are applied to base 16 via biasing device 22. Limiting device 25 is connected in shunt with a portion of inductance 20; this device limits the amplitude of voltage across the tank circuit, and thus prevents transistor 15 from saturating or cutting off at the extremes of the voltage swings. Limiting device 25 is illustrated in FIG. 1 as a semi-conductor varistor but may, of course, comprise any other nonlinear resistive element such as a thermistor, the resistance of which decreases with rising power dissipation therein.

The waveform of current drawn through collector 17 of transistor 15 is illustrated in FIG. 2 as waveform (*a*). As can be seen, this wave form is a sine wave having a frequency determined by tank circuit 14. In the illustrative circuit this frequency has been selected as 15,750 cycles per second. Changes in the temperature and other operating conditions of oscillator 10 will, of course, vary this frequency to some extent.

Collector 17 is connected to one end of the primary winding of a phase splitting transformer 26. The other end of the primary winding of transformer 26 is connected to voltage source 27 to provide the operating voltage for collector 17 of transistor 15. A second limiting device 28 is connected directly across this primary winding. The sinusoidal oscillatory collector current of transistor 15 thus produces a sharply limited voltage waveform across the primary winding of transformer 26. This waveform is illustrated in FIG. 2 as waveform (*b*), and can be seen to comprise essentially a square wave. The square wave is applied by way of lead 29 to terminal 30 and serves as a timing wave for the horizontal scanning operation in a television transmitter, not shown.

The resulting current in the primary winding of transformer 26 produces in the secondary windings steeply rising pulses of voltage each time the primary current changes direction. Furthermore, these pulses are equally spaced and alternately of opposite polarity, since the current in the primary winding alternately reverses its direction.

As illustrated in FIG. 1, the center tap 31 of the secondary winding of transformer 26 is connected to ground potential. This transformer therefore acts as a phase-splitter to produce waveforms at the two extremities of its secondary winding which are identical except for a 180 degree phase difference. The pulses appearing at the upper end of the secondary winding of transformer 26 are differentiated by capacitor 32 and resistor 33 to form a train of pips, illustrated in FIG. 2 as waveform (*c*); these pips are applied by way of resistor 34 to the base 35 of a transistor 36. Similarly, the pulses appearing at the lower end of the secondary winding of transformer 26 are differentiated by capacitor 37 and resistor 38 to form pips illustrated in FIG. 2 as waveform (*d*), and these are applied by way of resistor 39 to the base 40 of a transistor 41.

The collector 44 of transistor 36 is coupled to the base 40 of transistor 41 by way of a voltage divider comprising resistors 38 and 39 and a resistance-capacitance network 45. Similarly, the collector 42 of transistor 41 is coupled to the base 35 of transistor 36 by way of a voltage divider comprising resistors 33 and 34 and a resistance-capacitance network 43. The emitter 46 of transistor 36 and the emitter 47 of transistor 41 are connected together and coupled through a resistor 48 to ground potential.

Transistors 36 and 41 are cross-coupled so as to form a bistable circuit in which only one of the two transistors is permitted to conduct at a time. That is, when transistor 36 begins to conduct, a voltage is coupled by way of network 45 to the base 40 of transistor 41 to cut transistor 41 off. Similarly, when transistor 41 begins to conduct, a voltage is coupled by way of network 43 to the base 35 of transistor 36 to cut transistor 36 off. Either of these transistors will continue to conduct until a change to the opposite stable state is induced by an external signal.

Load resistors 49, 50 and 51 connect the collectors of transistors 36 and 41 to voltage source 27 and have values chosen to permit transistors 36 and 41 to operate in their linear range when in the conducting condition. That is, the voltage biases applied to transistors 36 and 41 are of such magnitudes as to prevent saturation when these transistors are in the On condition.

Bistable circuit 12 is caused to shift between its two stable states of operation by means of voltage pulses applied to the upper end of resistor 48. These voltage pulses are of proper polarity and of sufficient magnitude to cause the particular one of transistors 36 and 41 which is in the conducting state to be cut off and thus to initiate conduction in the other transistor by way of one of the cross-coupling networks.

When transistor 36 is in the On state, waveform (*c*), appearing at the upper end of resistor 33, is coupled by way of transistor 36 to point 52. When transistor 41 is in the On condition, waveform (*d*), appearing at the lower end of resistor 38 is coupled by way of transistor 41 to point 52. As transistors 36 and 41 are alternately turned on and cut off, the waveform at point 52 shifts between the waveform (*c*) and the waveform (*d*). The resulting waveform is illustrated as waveform (*e*) in FIG. 2.

Vertical oscillator 13 comprises a p-n-p transistor 53 having a base electrode 54, an emitter electrode 55 and a collector electrode 56. Base electrode 54 and emitter electrode 55 are coupled together by way of transformer 57 to provide blocking oscillator action. That is, a rise in voltage at emitter 55, caused by a voltage increase at base 54, is coupled by way of transformer 57 back to base 54 and thus further increases the voltage at base 54. This regenerative action continues until transistor 53 is saturated and no additional current flow can be maintained by emitter 55. Saturation of the transistor persists until a timing capacitor 63, connected between the lower primary terminal of transformer 57 and ground, is discharged to a point at which inadequate voltage remains across the transformer windings to sustain this condition. At this point the regenerative action reverses and abruptly cuts off the transistor. The impedance of transformer 57, effectively terminated by resistors 60 and 61 when the base-emitter impedance is low, serves to limit the current in the collector-emitter path of transistor 53 during saturation.

A variable resistor 59, connected in the emitter circuit of transistor 53, serves in association with capacitor 63 to determine the frequency of the vertical oscillator. That is, when transistor 53 is cut off following a period of saturation as described, the timing capacitor 63 gradually builds up a charge. Current is supplied to capacitor 63 from source 27 through variable resistor 59. When the voltage on capacitor 63 reaches a level almost sufficient to forward bias emitter 55, transistor 53 is triggered into conduction by a pulse applied to base 54 through a coupling capacitor 62 and the charge accumulated on capacitor 63 is again rapidly discharged through the primary winding of transformer 57 and the collector-emitter path of transistor 53. The resulting waveform across capacitor 63 is applied to terminal 64 and appears as waveform (*g*) in FIG. 2. This waveform serves as the vertical sweep voltage for a television transmitting apparatus, not shown.

As noted above, transistor 53 begins to conduct when emitter 55 becomes forward-biased. The instant at which this occurs is determined jointly by the gradual voltage increase on capacitor 63, the bias established by resistors 60 and 61 and the voltage pulses at point 52.

The base-emitter voltage waveform resulting from these three superimposed components is illustrated in FIG. 2 as waveform (*f*). As shown in FIG. 2, when the magnitude of this voltage exceeds a threshold level 65, corresponding to zero base-emitter potential, transistor 53 will begin to conduct. The regenerative action immediately takes effect, the voltage accumulated on capacitor 63 is rapidly discharged through transistor 53 and transistor 53 cuts off again.

A diode 66 is connected across the emitter winding of transformer 57 to quench oscillation of the transformer following the regenerative action. This is done to avoid objectionably large transient voltages across transistor 53, and also to dissipate stored energy in transformer 57 which might otherwise cause the durations of successive periods of oscillator 13 to be interdependent. In physical embodiments, it has been found preferable for the value of the integer $n$ to vary randomly, as opposed to varying systematically from cycle to cycle.

The voltage appearing at the collector 56 of transistor 53, shown as waveform (*h*) in FIG. 2, is applied to terminal 67 to provide the vertical blanking pulses for television transmitting apparatus, not shown. These pulses are also coupled by way of coupling capacitor 68 to the upper end of resistor 48 and are there used to trigger bistable circuit 12 between its two stable states.

From the above description it can be seen that horizontal scanning pulses generated in oscillator 10 are split in phase and differentiated by transformer 26, with the associated capacitors and resistors 32, 33, 34 and 37, 38, 39. Bistable circuit 12 alternately selects the two phases of these differentiated pulses after each cycle of the vertical oscillator and applies them to oscillator 13 as auxiliary triggering pulses. Vertical oscillator 13 therefore always triggers after an odd number of half cycles of the horizontal oscillator. The ratio of frequencies of oscillators 13 and 10 is thus always equal to $(n+\frac{1}{2})$, regardless of the actual values of these frequencies and hence, whatever the values of the integer $n$.

In the illustrative embodiment, oscillator 10 has been adjusted to a nominal frequency of 15,750 cycles per second and oscillator 13 to sixty cycles per second. The nominal ratio of these two frequencies is 262.5. Oscillators 10 and 13, however, have been designed with a view to simplicity and economy and hence neither has been more than moderately stabilized in frequency. Changes in ambient conditions such as temperature and supply voltage will cause these frequencies to drift. Although the resulting ration between these frequencies will also tend to drift, a continuously interlaced pattern is assured by the half cycle term added to their ratio by bistable circuit 12. It will be noted that this ratio has been greatly reduced in the waveforms of FIG. 2 for the purposes of clarity.

In accordance with the present invention, the simple and compact circuit of FIG. 1 is capable of generating a 2:1 interlaced scanning pattern for television transmitting apparatus. This interlaced pattern is accurately maintained in spite of any drift or small random fluctuation of frequency in the horizontal or vertical oscillators. Such a simple and economical synchronization signal generator is very valuable for inexpensive television systems such as closed circuit television and videotelephone, where reasonably good resolution is desirable, but where expensive and complicated circuitry is not warranted.

The invention has been illustrated in FIG. 1 with semiconductor devices because the low power consumption and small size of these devices makes them particularly suitable for small, compact circuitry. It is to be understood, however, that the principles of the invention may be just as readily implemented with other devices such as vacuum tubes, vacuum diodes and so forth, merely by choosing appropriate configurations for generating oscillations, differentiating, phase splitting and bistable gating. Similarly, it can be seen that a 3:1 interlace or any other interlace ratio can be similarly generated by appropriate phase shifts in the triggering pulses and a multistable gating circuit with the required number of stable conditions.

It is therefore to be understood that the above-described arrangements are merely illustrative of numerous and varied other arrangements which may constitute applications of the principles of the invention. Such other arrangements may readily be devised by those skilled in the art without departing from the spirit and scope of the invention.

What is claimed is:

1. A synchronization signal generator for use in television systems comprising a high frequency source of horizontal synchronizing pulses, means for differentiating said horizontal synchronizing pulses, means for shifting the phase of said differentiated horizontal synchronizing pulses by 180 degrees, a low frequency source of vertical synchronizing pulses, means for triggering said low frequency source with the output of said phase shifting means, and means controlled by said low frequency source for disabling alternate phases of said differentiated horizontal synchronizing pulses during alternate cycles of said low frequency source.

2. Means for generating interlaced television scanning signals comprising a free-running source of horizontal synchronizing pulses, means for shifting the phase of said horizontal synchronizing signals in integral submultiples of 360 degrees, a triggerable source of vertical synchronizing signals, means for applying successively phase shifted horizontal synchronizing signals to trigger successive cycles of said synchronizing signal source, and means to disable those of said phase shifted signals not applied to said frame synchronizing signal source.

3. The combination according to claim 2 in which said phase shifting means comprises a phase-splitting transformer producing two signal 180 degrees out of phase with respect to each other.

4. A television scanning signal generator comprising a source of horizontal scanning signals, phase splitting means, means for applying said horizontal scanning signals to said phase splitting means, a source of vertical scanning signals, bistable gating means, means for changing the state of said bistable gating means after each cycle of said vertical scanning signal source, and means including said bistable gating means for applying alternate phases of said horizontal scanning signals to trigger said vertical scanning signal source on alternate cycles of said vertical scanning signal source.

5. A television scanning signal generator for generating interlaced television scanning patterns comprising a source of horizontal scanning signals producing signals at a plurality of equally displaced phases, a source of vertical scanning signals adapted to be triggered by externally supplied pulses, and means under the control of said vertical scanning signal source for successively applying different ones of said phase displaced signals to trigger said vertical scanning signal source.

6. The television scanning signal generator according to claim 5 in which said trigger applying means comprises multistable circuit means having a number of stable stages equal to the number of said phase displaced signals and corresponding thereto, means for enabling the corresponding one of said phase displaced signals when said multistable circuit means is in each stable state, and means responsive to said vertical scanning signal source for changing the state of said multisable circuit means after each cycle of said vertical scanning signal source.

7. A signal generator for generating interlaced television scanning signals comprising a source of horizontal scanning signals, means to produce therefrom two triggering signal sequences displaced in phase by 180 degrees, a triggerable source of vertical scanning signals, and means for alternately triggering said vertical scanning signal generator with each of said triggering signal sequences.

8. The signal generator according to claim 7 wherein said triggering means includes bistable gating means to alternately disable said triggering signal sequences in response to outputs from said vertical scanning signal generator.

References Cited in the file of this patent

UNITED STATES PATENTS

| | | |
|---|---|---|
| 2,407,956 | Hallmark | Sept. 17, 1946 |
| 2,619,632 | Krumhansl | Nov. 25, 1952 |
| 2,730,622 | Janssen | Jan. 10, 1956 |
| 2,845,535 | Kruse | July 29, 1958 |
| 2,922,037 | Reise | Jan. 19, 1960 |

FOREIGN PATENTS

| | | |
|---|---|---|
| 672,125 | Great Britain | May 14, 1952 |